Nov. 4, 1958 R. F. GUENTHER, JR 2,858,999
FISHING REEL ARBOR
Filed March 31, 1955
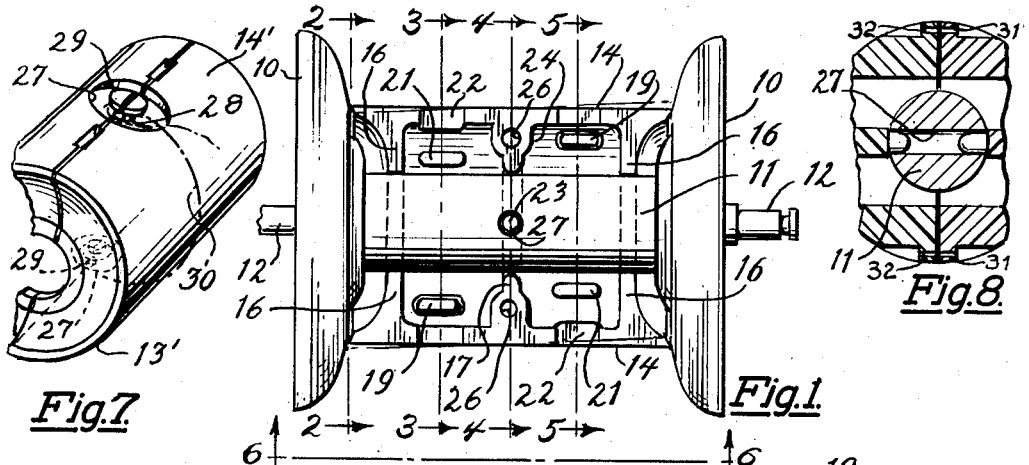
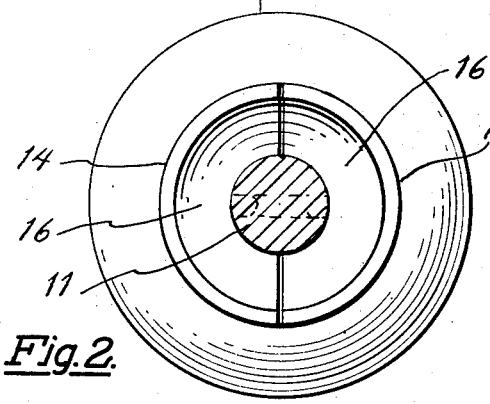
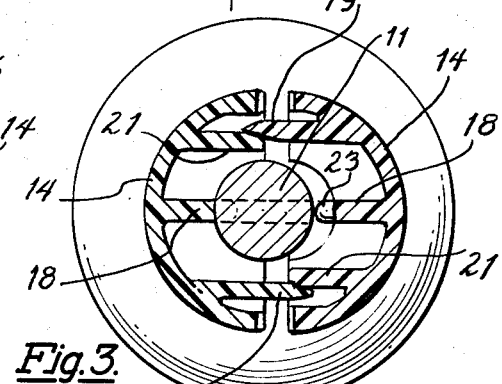
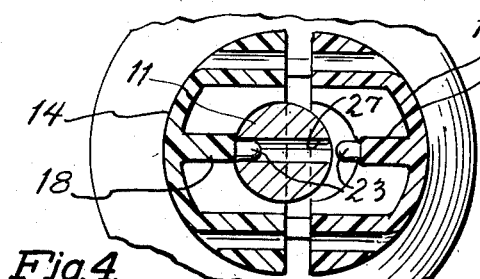
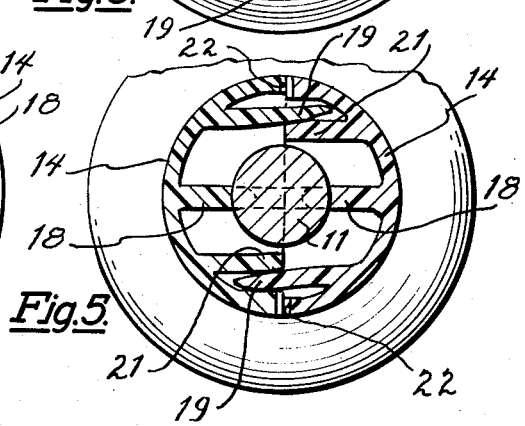
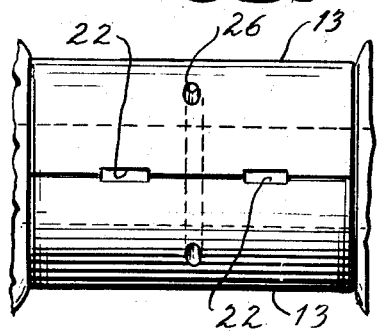
INVENTOR.
Robert F. Guenther, Jr.
BY Nathan N. Kraus
Frank H. Morlos
Attorneys

UNITED STATES PATENT OFFICE 2,858,999
Patented Nov. 4, 1958

2,858,999

FISHING REEL ARBOR

Robert F. Guenther, Jr., Elmhurst, Ill., assignor, by mesne assignments, to Sears, Roebuck and Co., Chicago, Ill., a corporation of New York Application March 31, 1955, Serial No. 498,171

4 Claims. (Cl. 242—125.1)

This invention relates to arbors for fishing reel spools.

The present invention has for its principal object the provision of a molded plastic arbor which is capable of convenient and quick attachment to or detachment from a conventional spool and which, when attached, will be caused to rotate with the spool during the reeling or unreeling operation of the latter. Such arbors, in effect, increase the diameter of the spool, promoting the efficiency of the reel by permitting reeling-in of the line at a faster rate and with less effort.

Another object of my invention is the provision of an arbor of the foregoing type in which elements of the arbor sections interengage with one another and the sections cooperate to provide a firm, continuous cylindrical support for the line, so that the line is prevented from being snagged between the ends of the sections and the inner convex surfaces of the spool flanges.

A further object of my invention is the provision in an arbor of the foregoing character of novel means for effecting securement of a line to the arbor, whereby the line itself affords means for securing the arbor sections in assembled relation.

A further object of my invention is the provision of an arbor of the foregoing character, which is simple in construction, durable in service and economical to manufacture.

Other and further objects and advantages of my invention will become apparent from the following description when considered in connection with the accompanying drawings, in which—

Fig. 1 is a side elevational view of a fishing reel spool showing the inside of an arbor section attached thereto;

Fig. 2 is a cross-sectional view taken substantially on line 2—2 of Fig. 1;

Fig. 3 is a cross-sectional view taken substantially on line 3—3 of Fig. 1;

Fig. 4 is a cross-sectional view taken substantially on line 4—4 of Fig. 1.

Fig. 5 is a cross-sectional view taken on line 5—5 of of Fig. 1;

Fig 6. is a view looking in the direction of the arrows 6—6 of Fig. 1 and showing both sections of the arbor mounted on a spool and in cooperating relation;

Fig. 7 is a fragmentary perspective view of a modified embodiment; and

Fig. 8 is a fragmentary transverse cross-sectional view of another modified embodiment.

Referring to the drawings, my invention is shown attached to one type of a fishing reel spool, the construction of which includes the usual flanges 10, a shaft or barrel 11 and end spindles 12. The arbor of my invention consists of two identical semi-cylindrical sections 13 molded from a suitable plastic material well known in the art. Each section 13 includes a semi-cylindrical line-supporting wall 14, a pair of radial shaft-engaging end bearings 16 spaced inwardly a short distance from the end extremities of the sections and a center bearing 17 medially spaced from the end bearings 16. All of these shaft-engaging bearings are integrally connected to the wall and are stabilized by a longitudinal medial web 18 which connects said bearings and affords a bearing surface for engagement with the shaft 11. Both ends of the wall 14 are chamfered so as to afford a snug engagement with the spool flanges 10.

A pair of integral flexible fingers 19 extends inwardly of the wall, the said fingers being diagonally disposed and spaced from respective bearings, as clearly illustrated in Fig. 1. The said fingers are disposed in parallel planes which are equidistant from the medial web 18. The fingers 19 extend beyond a plane formed by the longitudinal marginal edges of the section, and the ends of the said fingers are tapered, as illustrated clearly in Figs. 3 and 5. In opposed relation to the fingers is a second pair of fingers 21 integral with the wall 14 and extending inwardly thereof. These fingers 21 are relatively stiffer than the fingers 19. The fingers 19 similarly are in parallel relationship, but are disposed somewhat closer to the medial web 18 than the fingers 19. The portions 22 of wall 14 opposite the fingers 21 are slightly thickened, as illustrated in Fig. 1 and are recessed at the longitudinal edges (Fig. 6) to permit insertion of a suitable tool to facilitate separation of the two sections from a spool. The said fingers terminate slightly short of a plane formed by the longitudinal marginal edges of the section.

At the intersection of the center bearing 17 and the medial rib 18 there is provided a bullet-nosed radial projection 23 which is substantially cylindrical. As seen clearly in Fig. 1, the center bearing 17 for a portion of its length at its juncture with the wall 14 is enlarged at opposite ends as at 24. An aperture 26 extends through each such enlargement and wall 14 in a general chordal direction, the said apertures being parallel and in co-planar relationship.

When the arbor sections are properly mounted on the spool, as will be hereinafter described, the apertures 26 in one section are aligned with corresponding apertures in the cooperating section, so that a line may be threaded therethrough and tied in a loop, thereby to assist in maintaining the sections in assembled relation on the shaft 11. It will of course be understood that the line may be passed through only one pair of registering apertures of the two sections, to secure the line about the arbor sections. When the sections are properly mounted on a reel spool, the projection 23 of each section is received in the aperture 27 usually provided in the shaft 11, and the bearings and bevelled end margins of the sections are in intimate contact with the shaft and the flanges, respectively.

The relative positioning of cooperating fingers 19 and 21 of the respective sections is such that, when the sections are brought together in exact registration, as illustrated in Fig. 3, the fingers are not in alignment, but one finger is slightly offset from the other. When the sections are forced together by manual pressure, the fingers 19, which are of less cross-section than fingers 21, are caused to flex and ride over the fingers 21 to assume the position illustrated in Fig. 5, wherein the fingers 19 and 21 are in frictional engagement. One section is preferably applied in advance of the other and will be retained on the spool. The dimensions of the bearing portions 16 and 17 and the lengths of the walls 14 of the sections in relation to the spool are such that corresponding parts of the spool are intimately frictionally engaged by the sections. Thus, after one section has been applied, the second section, when being applied, by reason of the relatively close fit between the section and the spool, is caused to assume a position of exact registration with the other section, thereby bringing cooperating fingers of opposed sections into desired frictional engagement. It will be apparent that the intimate fit of the arbor sections on the spool will itself assist in maintaining the sections on the spool, and that the spool itself serves, in effect as a means for camming the sections into exact registration with each other.

By reason of the slightly offset relationship of the fingers 19 and 21, upon initial engagement of the said fingers one of the sections will be misaligned relative to the other and will assume substantially the dotted line position illustrated in Fig. 1. Upon the application of manual pressure to the sections, the shaft 11 and flanges 10 effect a camming action on one of the sections, causing it to rock about the axis of aperture 27 to assume the full-line position illustrated in Fig. 1.

In the modified embodiment illustrated in Fig. 7, the structure is identical with that illustrated in Figs. 1-6, except that the apertures such as 26 for receiving the line are eliminated and each wall portion 14' is provided with a medial substantially semi-circular recess 27 along a longitudinal edge. A radial projection 28 provided with an enlarged semi-circular head 29 is located in concentric relation to said recess with the top surface of the head being in the curved plane of the surface of the wall portion 14'. When the two sections 13' are in assembled relation, as illustrated in Fig. 7, the projections and heads are in registration and form a headed member about which one end of a line 30 may be looped, whereby the line may be secured to the arbor, the line also serving to secure the sections in assembled relation. The loop of the line and any knot formed therein are, of course, contained in the recesses 27 below the surfaces of the walls 14' and, of course, do not interfere with the smooth winding of the line on the walls 14'. For purposes of symmetry it is desirable to provide an equivalent structure at a diametrically opposed position on the walls 14', as indicated by the dotted lines. A line then may be looped about both sets of projections and circumferentially about the arbor sections, if desired.

In the modified embodiment illustrated in Fig. 8, the structure is substantially similar to that illustrated in Fig. 7. In this embodiment, however, the radial projections 31, located in the same relation as the projections 28, are pierced transversely to provide apertures 32 and heads such as 29 are omitted. When the arbor sections are in assembled relation, the apertures 32 are in registration and a line may be threaded therethrough for securement to the arbor, the line also serving to maintain the arbor sections in assembled relation.

Various changes and modifications coming within the spirit of my invention will doubtless suggest themselves to those skilled in the art. Hence, I do not wish to be limited to the specific form shown or uses mentioned.

I claim:

1. A pair of arbor sections shaped to form an arbor about a shaft, each of said sections having an external substantially semi-cylindrical line-supporting wall with longitudinal marginal edges, each wall having on its outer surface a projection adjacent a longitudinal edge and a recess surrounding the same, the top surface of said projection lying substantially in the plane of the outer surface of said wall, said projections when said sections are in assembled relation being continuous and affording means for securing a line to said arbor.

2. A pair of arbor sections shaped to form an arbor about a shaft, each of said sections having an external wall with longitudinal marginal edges, each wall having on its outer surface a projection adjacent a longitudinal edge provided with an enlarged head, the top surface of said head lying substantially in the plane of the outer surface of the supporting wall, said wall having a well surrounding said projections, said projections when said sections are in assembled relation being contiguous and affording a headed member for securing a line thereto, the said line when looped around said member also securing said sections in assembled relation.

3. A pair of arbor sections shaped to form an arbor about a shaft, each of said sections having an external substantially semi-cylindrical line-supporting wall with longitudinal marginal edges, each wall having on its outer surface a projection adjacent a longitudinal edge and a recess surrounding the same, the top surface of said projection lying substantially in the plane of the outer surface of said wall, each of said projections having a transverse aperture therein, the apertures of cooperating arbor sections being in registration and affording means for securing a line to said arbor, the said line, when passed through said registering apertures also securing said sections in assembled relation.

4. A pair of arbor sections shaped to form an arbor about a shaft, each of said sections having an external wall with longitudinal marginal edges, each wall having on its outer surface a projection adjacent a longitudinal edge and provided with a transverse aperture, the top surface of each projection lying substantially in the plane of the outer surface of the supporting wall, said wall having a well surrounding said projection, said projections when said sections are in assembled relation being contiguous with respective apertures in registration and affording means for securing a line thereto, the said line when passed through said registered apertures also securing said sections in assembled relation.

References Cited in the file of this patent

UNITED STATES PATENTS

| | | |
|---|---|---|
| 806,064 | Carter | Nov. 28, 1905 |
| 2,025,890 | Payne | Dec. 31, 1935 |
| 2,336,981 | Clickner | Dec. 14, 1943 |
| 2,696,951 | Wood | Dec. 14, 1954 |
| 2,775,418 | Cadman | Dec. 25, 1956 |
| 2,777,648 | Wood | Jan. 15, 1957 |

UNITED STATES PATENT OFFICE
CERTIFICATE OF CORRECTION

Patent No. 2,858,999                                          November 4, 1958

Robert F. Guenther, Jr.

It is hereby certified that error appears in the printed specification of the above numbered patent requiring correction and that the said Letters Patent should read as corrected below.

Column 4, line 9, for "continuous" read -- contiguous --.

Signed and sealed this 3rd day of February 1959.

(SEAL)
Attest:

KARL H. AXLINE                                          ROBERT C. WATSON

Attesting Officer                                       Commissioner of Patents